(12) United States Patent
Balan et al.

(10) Patent No.: US 7,752,848 B2
(45) Date of Patent: Jul. 13, 2010

(54) SYSTEM AND METHOD FOR CO-PRODUCTION OF HYDROGEN AND ELECTRICAL ENERGY

(75) Inventors: Chellappa Balan, Niskayuna, NY (US); Andrei Colibaba-Evulet, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1143 days.

(21) Appl. No.: 10/810,471

(22) Filed: Mar. 29, 2004

(65) Prior Publication Data

US 2005/0210881 A1    Sep. 29, 2005

(51) Int. Cl.
F02C 6/18    (2006.01)
(52) U.S. Cl. .................................. 60/780; 60/39.53
(58) Field of Classification Search .................. 60/780, 60/775, 783, 39.182, 39.511, 39.53, 39.12
See application file for complete search history.

(56) References Cited

U.S. PATENT DOCUMENTS

| 3,982,962 | A |   | 9/1976  | Bloomfield |              |
|-----------|---|---|---------|------------|--------------|
| 3,986,349 | A | * | 10/1976 | Egan       | 60/781       |
| 4,308,128 | A | * | 12/1981 | Cummings   | 208/86       |
| 4,622,275 | A | * | 11/1986 | Noguchi et al. | 429/19   |
| 5,343,691 | A | * | 9/1994  | Coffinberry | 60/776      |
| 5,417,051 | A |   | 5/1995  | Ankersmit et al. |        |
| 5,832,718 | A | * | 11/1998 | Suttrop     | 60/39.465   |
| 5,938,800 | A |   | 8/1999  | Verrill et al. |          |
| 6,025,403 | A | * | 2/2000  | Marler et al. | 518/703  |
| 6,348,278 | B1 |  | 2/2002  | LaPierre et al. |        |
| 2001/0047040 | A1 | | 11/2001 | Agee et al. |            |
| 2003/0068260 | A1 | | 4/2003  | Wellington et al. |      |
| 2003/0170518 | A1 | | 9/2003  | Clawson et al. |         |
| 2003/0215762 | A1 | * | 11/2003 | Retallick | 431/12     |
| 2004/0031388 | A1 | * | 2/2004  | Hsu       | 95/143     |
| 2004/0191591 | A1 | * | 9/2004  | Yamamoto  | 429/19     |

FOREIGN PATENT DOCUMENTS

| EP | 0356906      |    | 7/1990  |
|----|--------------|----|---------|
| EP | 1136542      | A1 | 9/2001  |
| WO | WO99/41188   |    | 8/1999  |
| WO | WO02/02460   | A2 | 1/2002  |
| WO | WO02/078109  | A1 | 10/2002 |

OTHER PUBLICATIONS

The International Search Report dated Jul. 27, 2005.

* cited by examiner

*Primary Examiner*—Michael Cuff
*Assistant Examiner*—Andrew Nguyen
(74) *Attorney, Agent, or Firm*—Patrick K. Patnode

(57) ABSTRACT

A system for co-production of hydrogen and electrical energy comprising a reformer configured to receive a reformer fuel and steam and produce a reformate rich in hydrogen. The system further comprises a separation unit in fluid communication with the reformer wherein the separation unit is configured to receive the reformate to separate hydrogen from the reformate and produce an off gas. The system also includes a combustor configured to receive a fuel for combustion and produce heat energy and a hot compressed gas, wherein the combustor is coupled with the reformer. A gas turbine expands the hot compressed gas and produces electrical energy and an expanded gas; wherein at least a part of the heat energy from the combustor is used to produce the reformate in the reformer.

20 Claims, 7 Drawing Sheets

SYSTEM AND METHOD FOR CO-PRODUCTION OF HYDROGEN AND ELECTRICAL ENERGY

BACKGROUND OF THE INVENTION

The present invention relates to energy generation systems and more particularly to co-production of hydrogen and electrical energy.

In recent years, various attempts have been made to use a combined cycle power generating system, in which system a fuel is burned in a combustor to produce a hot gas which hot gas drives a gas turbine to generate electrical power. The combustor in a combined cycle power generation system is typically cooled by compressed air, which compressed air is readily available in the plant. Using compressed air for cooling the combustor limits the lower limit of the flame temperature in the combustor, which in turn, may result in higher nitrous-oxide (NOx) production and emission.

A co-production route typically produces electricity as well as some liquid fuel or chemical from the same feedstock. The concept of co-production is based on producing chemicals or liquid fuels during the lean electricity demand period and using them to augment power production during the peak period. Hydrogen, one of the most extensively used fuels, that is produced in such a co-production plant can be used in several ways including electricity generation.

Typically Steam reforming of a hydrocarbon fuel, such as natural gas, is the primary means of hydrogen production. The reforming reaction is an endothermic reaction wherein external heat has to be supplied. Typically this external heat is supplied by burning a part of the fuel used for reforming or any fuel rich gas available in the reforming plant. This process is energy intensive and may produce significant amount of nitrous oxides (NOx).

With the advent of hydrogen economy the demand for a co-production system, which system can produce hydrogen and electricity, is expected to increase. Accordingly, there is a need to design a co-production system, which system can produce hydrogen and electrical energy in an efficient manner while limiting the NOx emission.

SUMMARY OF THE INVENTION

In one aspect, a system for co-production of hydrogen and electrical energy comprising a reformer configured to receive a reformer fuel and steam and produce a reformate rich in hydrogen. The system further comprises a separation unit in fluid communication with the reformer, wherein the separation unit is configured to receive the reformate to separate hydrogen from the reformate and produce an off gas. The system also includes a combustor configured to receive a fuel for combustion and produce heat energy and a hot compressed gas, wherein the combustor is coupled with the reformer. A gas turbine expands the hot compressed gas and produces electrical energy and an expanded gas; wherein at least a part of the heat energy from the combustor is used to produce the reformate in the reformer.

In yet another aspect, a system for co-production of hydrogen and electrical energy comprising a reformer configured to receive a reformer fuel and steam and produce a reformate rich in hydrogen. The system further comprises a combustor configured to receive a fuel for combustion and produce heat energy and a hot compressed gas, wherein the combustor is coupled with the reformer. A separation unit is in fluid communication with the reformer, which separation unit is configured to receive the reformate to separate hydrogen from the reformate and produce an off gas. At least a part of the heat energy from the combustor is used to produce the reformate in the reformer. A gas turbine expands the hot compressed gas and produce electrical energy and an expanded gas. At least a part of the heat energy from the combustor is used to produce the reformate in the reformer. The separation unit is configured to separate carbon dioxide from the reformate and recycle at least a part of the off gas to the reformer.

In yet another aspect, a method for co-production of hydrogen and electrical energy comprising reforming a mixture of a reformer fuel and steam in a reformer and producing a reformate rich in hydrogen. The method further comprises separating hydrogen from the reformate and producing an off gas. The method also includes combusting a fuel in a combustor and producing heat energy and a hot compressed gas, wherein the combustor is coupled with the reformer. The hot compressed gas is expanded in a gas turbine producing electrical energy and an expanded gas; wherein at least a part of the heat energy from the combustor is used to produce the reformate in the reformer.

In yet another aspect, a combustor reformer system comprising a combustor configured to receive a fuel and an oxidant for combustion and production of a hot compressed gas and heat energy. A reformer in is intimate contact with the combustor, which reformer is configured to receive a reformer fuel and steam and produce a reformate rich in hydrogen. The reformer is coupled with the combustor and at least a part of the heat energy from the combustor is used to produce the reformate in the reformer.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
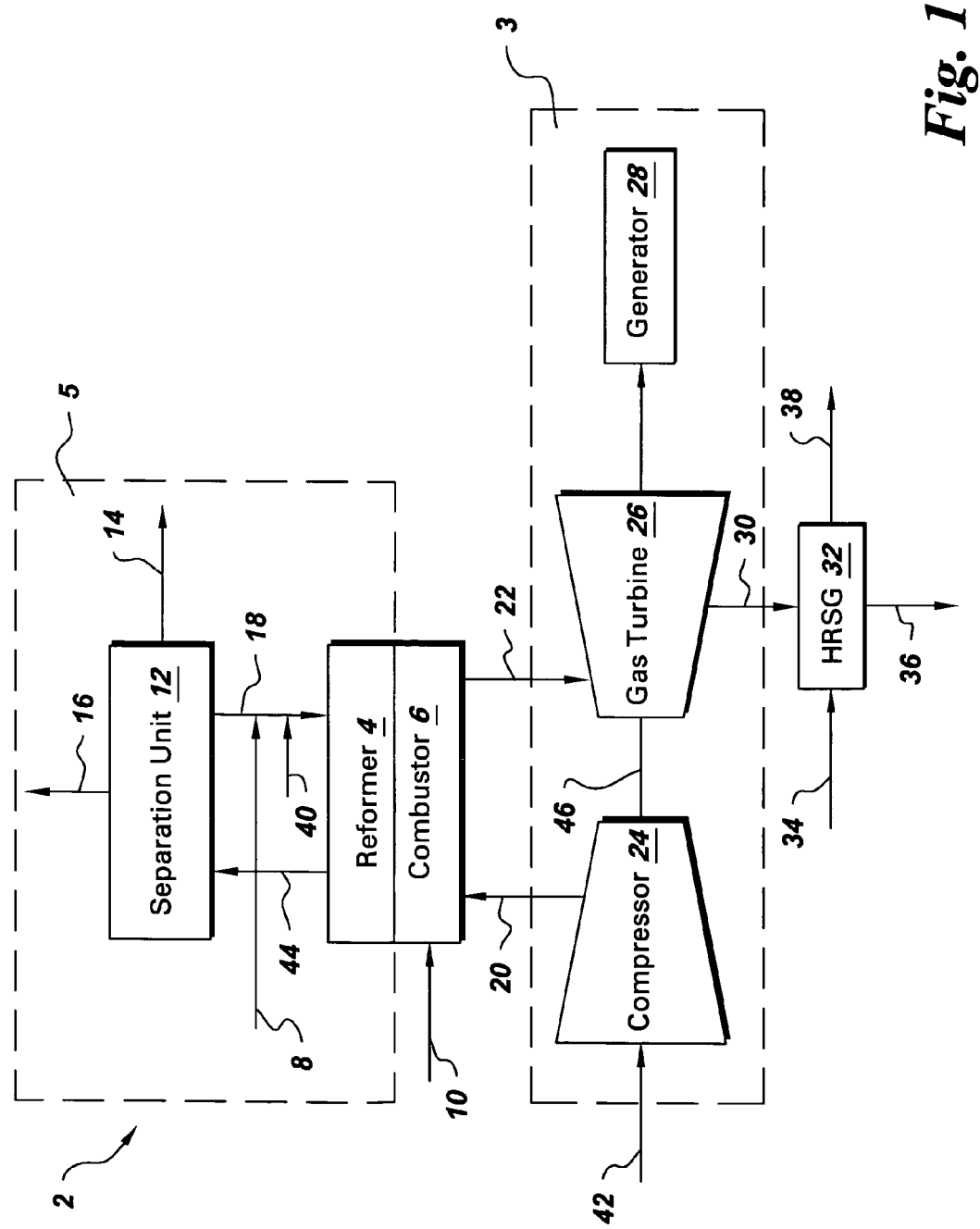
FIG. 1 illustrates a schematic process flow diagram of a first exemplary co-production system.

FIG. 1 schematically represents an exemplary co-production system 2 for producing hydrogen and electrical energy including a turbine portion 3 and a hydrogen generation portion 5. The hydrogen generation portion includes a reformer 4, and a separation unit 12. The turbine portion includes a combustor 6, a compressor 24, a gas turbine 26, and a rotor 46, by which rotor, turbine 26 drives the compressor 24. The reformer 4 is coupled with the combustor 6, wherein the heat of combustion from the combustor 6 is utilized in the reforming process in the reformer 4. As explained in some detail below, while the basic components of the co-production system 2 are mostly well known, efficiency improvements in relation to known systems are obtained through strategic interconnection of system components with recirculation flow paths to enhance performance and efficiency of the system. The efficiency of a co-production system is enhanced by recovering the energy from the exhaust streams from the co-production system. In the various embodiments of the co-production systems described herein, the oxidant used in the combustion process is ambient air. It is understood that any other oxidant stream comprising the required amount of oxygen for the combustion may be used for the same purpose.

In operation, the reformer 4 is configured to receive a fuel stream 8 and steam 40. In the reformer 4, the fuel stream 8 reacts with the steam 40 to produce a reformate stream 44 rich in hydrogen. The reformate stream 44 is sent to a separation unit 12, which separation unit 12 is configured to produce a substantially pure hydrogen stream 16, and an off gas stream 18. In some embodiments the separation unit 12 further produces a stream 14, rich in carbon dioxide ($CO_2$).

Typically, reforming a hydrocarbon fuel, such as natural gas along with steam, produces hydrogen. This process is energy intensive and significant heat is absorbed in the overall reforming process. The main constituent of natural gas is methane ($CH_4$), which reacts with steam in a two-step reaction to produce hydrogen. Through the reforming process, natural gas is converted to hydrogen following the reactions (1) and (2) as mentioned below.

$$CH_4 + H_2O \Rightarrow CO + 3H_2 \quad (1)$$

$$CO + H_2O \Rightarrow CO_2 + H_2 \quad (2)$$

At least a portion of the incoming fuel 8 is converted to generate hydrogen by the reforming process in the reformer 4. The reforming reaction (1) takes place in presence of a suitable steam reforming catalyst, such as nickel. The reforming reaction (1) is highly endothermic, having a heat of reaction of approximately 88,630 BTU/mole. Reforming reactions of other hydrocarbon fuels are similarly endothermic. The reformate stream 44 comprises carbon monoxide (CO), carbon dioxide ($CO_2$), hydrogen ($H_2$), unutilized fuel and water. The reformate stream 44 is fed into a separation unit 12, which separation unit separates hydrogen and carbon dioxide from the reformate stream 44 and produces a carbon dioxide rich stream 14, a hydrogen rich stream 16, and an off gas stream 18. In one embodiment the off gas stream 18 is recycled back to the fuel inlet stream 8 and the mixed stream is fed into the reformer 4 along with steam.

The heat required for the endothermic reforming reaction (1) is supplied by the heat of combustion from the combustor 6, which combustor 6 is coupled with the reformer 4. The combustor 6 is configured to receive an inlet fuel stream 10 and a compressed oxidant stream 20. The inlet fuel stream 10 and the oxidant stream 20 may be premixed and injected into the combustor 6. In some embodiments, the fuel and the oxidant may be injected separately into the combustor 6. In some other embodiments, the fuel and the oxidants are partially or fully mixed prior to being fed into the combustor 6. The inlet fuel stream 10 may comprise any suitable gas or liquid, such as for example, hydrogen, natural gas, methane, naphtha, butane, propane, diesel, kerosene, an aviation fuel, a coal derived fuel, a bio-fuel, an oxygenated hydrocarbon feedstock, and mixtures thereof. In some embodiments, the fuel may preferably comprise hydrogen or natural gas (NG) or a mixture thereof. In some other embodiments, a part of the off gas stream 18 from the separation unit 12 is used as a fuel for the combustor 6. The compressed oxidant 20 from the compressor 24 may comprise any suitable gas containing oxygen, such as for example, air, oxygen rich air, oxygen depleted air, and/or pure oxygen. In operation, an exemplary compressor 24 is a multi-stage compressor that includes rows of stationary vanes and rotating blades. The combustion process in the combustor 6 generates a hot gas stream 22.

Returning to FIG. 1, the hot gas stream 22 from the combustor 6 is fed into a gas turbine 26. The co-production system 2 further comprises a generator 28 attached to the gas turbine 26 and a heat recovery steam generator (hereinafter HRSG). The thermodynamic expansion of the hot gas stream 22 fed into the gas turbine 26 produces power to drive the gas turbine 26, which, in turn, generates electricity through the generator 28. Electricity from the generator 28 is converted to an appropriate form and is provided to a distribution power supply network grid (not shown). An expanded gas 30 from the gas turbine 26 is fed into the HRSG 32 for recovering the heat content of the expanded gas 30. A water stream 34 is fed into the HRSG 32, which in turn generates steam 38 by utilizing the heat recovered from the hot expanded gas 30 from the gas turbine 26. The cooled expanded gas 36 from the HSRG 32 is vented into the atmosphere.

Various exemplary embodiments of the co-production system are illustrated in FIGS. 2, 3, 4 and 5. All exemplary embodiments, as illustrated in FIGS. 2, 3, 4 and 5 share the basic components of the co-production system 2 as illustrated, in which like features are designated with like reference numerals.

Figure 2:
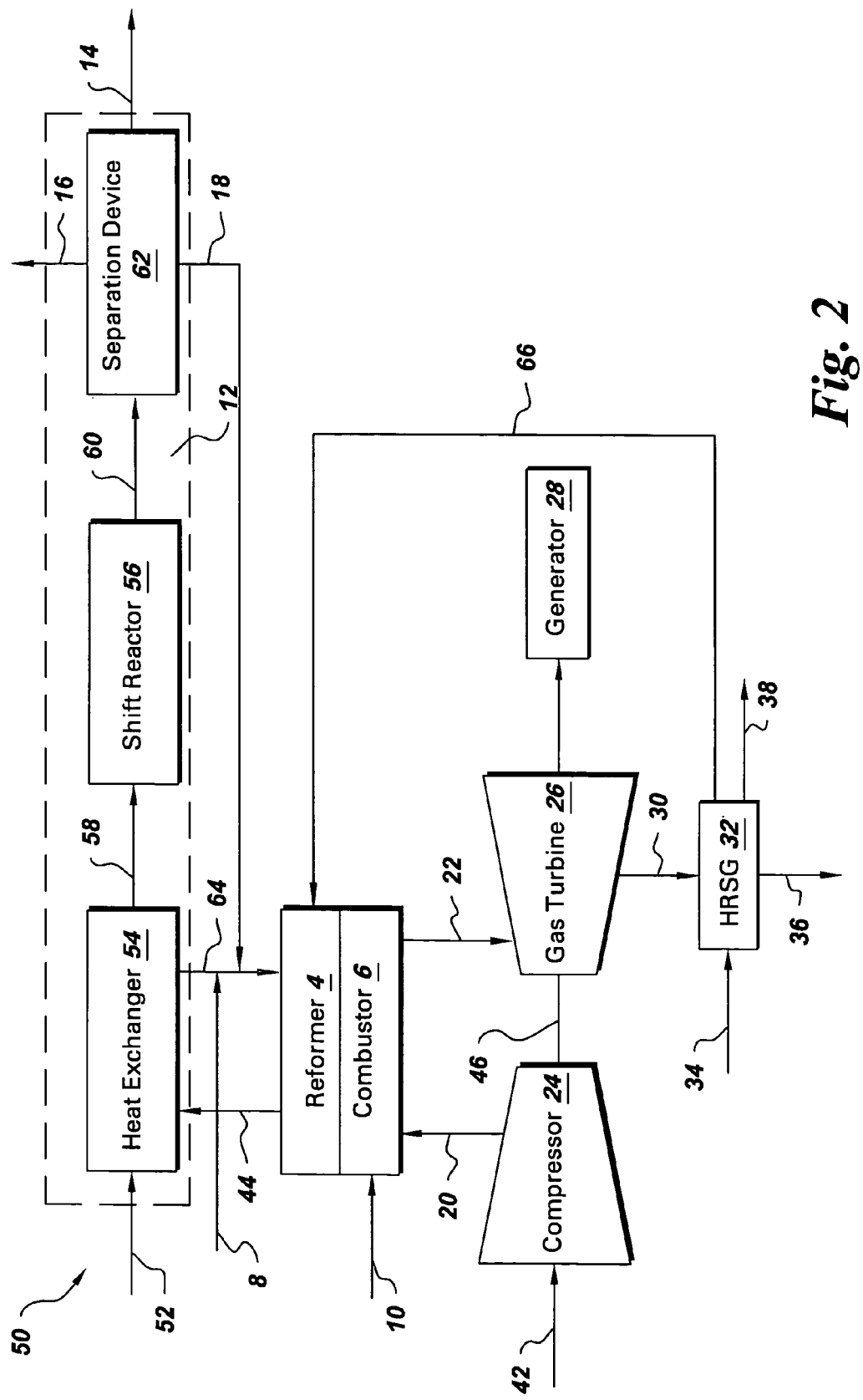
FIG. 2 illustrates a schematic process flow diagram of a second exemplary co-production system.

A second exemplary embodiment of the co-production system 50 is illustrated in FIG. 2. In accordance with the second embodiment, the separation unit 12 comprises a heat exchanger 54, a shift reactor 56 and a separation device 62. Operationally, the reformer 4 is in fluid communication with the heat exchanger 54. A water stream 52 is introduced to the heat changer 54, wherein the water is converted to steam 64 by utilizing the heat recovered from the reformate steam 44 from the reformer 4. The steam 64 generated in the heat exchanger 54 is used for the reforming process in the reformer 4.

The reformate stream 44 generated from the reformer 4 comprises hydrogen ($H_2$), carbon monoxide (CO), carbon dioxide ($CO_2$), water and unreacted fuel. The reformate stream 44 is cooled to a temperature of between about 200° C. to about 400° C. using the heat exchanger 54 to generate a cooled reformate stream 58. The carbon monoxide and water in the cooled reformate stream 58 may react further to produce carbon dioxide. This may be achieved through the exothermic reaction (2), known as a water gas shift reaction. The $CO_2$ lean cooled reformate stream 58 is fed into a shift reactor 56 to facilitate the water gas shift reaction in the presence of a catalyst. The exit stream 60 from the shift reactor 56 comprises unreacted fuel, carbon dioxide water, hydrogen and traces of unconverted carbon monoxide. The exit stream 60 may also be designated as a stream rich in hydrogen and carbon dioxide.

The exit stream 60, rich in hydrogen and carbon dioxide, from the shift reactors 56 is fed into a separation device 62, which separation device 62 may further comprise a carbon dioxide separator. The carbon dioxide separator may apply various techniques known in the art including but not limited to pressure swing adsorptions chemical absorption and membrane separation to separate carbon dioxide from the exit stream 60.

Pressure swing adsorption (PSA) may be used for separation of carbon dioxide from a mixture of gases containing hydrogen. In PSA techniques, at a high partial pressure, solid molecular sieves can adsorb carbon dioxide more strongly than hydrogen. As a result, at elevated pressures, carbon dioxide is removed from the mixture of gases comprising hydrogen when this mixture is passed through an adsorption bed. Regeneration of the bed is accomplished by depressurization and purging. Typically for critical operations, a plurality of adsorption vessels are used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes, which are selective to $CO_2$. However, the separation efficiency of membrane technologies is low, and complete separation of carbon dioxide may not be achieved through membrane separation. Typically membrane separators work more efficiently at higher pressures, and use of a membrane separator to separate the carbon dioxide from the exit stream 60 from the shift reactor 56 may be achieved by further compression of the exit stream 60 prior to the separation of $CO_2$.

Yet another technique used for separation of $CO_2$ from the exit stream 60 may include, but is not limited to, chemical absorption of $CO_2$ using amines. The exit stream 60 may be cooled to a suitable temperature to use chemical absorptionl of carbon dioxide using amines. This technique is based on alkanol amines solvents that have the ability to absorb carbon dioxide at relatively low temperatures, and are easily regenerated by raising the temperature of the rich solvents. A carbon dioxide rich stream 14 is obtained after regeneration of the rich solvent. The solvents used in this technique may include triethanolamine, monoethanolamine, diethanolamine, diisopropanolamine, diglycolamine, and methyldiethanolamine.

In some embodiments, the carbon dioxide separator may comprise at least one adsorption bed where a PSA technique is used to separate the carbon dioxide from the exit stream 60. In some other embodiments, the carbon dioxide separator may comprise at least one absorption vessel, where a chemical absorption technique is used. In yet another embodiment the carbon dioxide separator comprises at least one membrane separator. Using the various techniques described herein, a carbon dioxide rich stream 14 is generated from the separation device 62. The carbon dioxide rich stream 14 may be exported for any other industrial use.

The separation device 62 may further comprise a hydrogen separator. The methods to separate hydrogen from other gases to produce a substantially pure hydrogen stream 16 include PSA and membrane separation. A variety of polymers may be used for hydrogen selective membranes, which operate at relatively low temperatures. In one embodiment, the separation efficiency of the hydrogen can be enhanced by combining a PSA unit with $CO_2$ separation membranes. In the first step $H_2$ is separated by a PSA technique. In the next step, $CO_2$ is separated by $CO_2$ selective membranes. Some polymeric membranes show good permselectivity for $CO_2$ separation at relatively low temperature.

In some embodiments, the hydrogen separator may use a cryogenic separation technique. Cryogenic separation may be used when it is important to recover multiple fractionates and multiple products. In one embodiment, the exit stream 60 from the shift reactor 56 is compressed to approximately 900 psia and then cooled to room temperature using a condenser, which liquefies the $CO_2$. Hydrogen can be recovered as a gas from this process, while the $CO_2$ is removed as liquid from the bottom of the condenser. The hydrogen separator may further be integrated with a moisture separator.

As illustrated in FIG. 2, three streams are recovered from the separation device 62, a substantially pure hydrogen stream 16, a carbon dioxide rich stream 14 and an off gas 18. They off gas stream 18 from the separation device 62 comprises unreacted fuel, unseparated hydrogen and water. In some embodiments it may further comprise traces of carbon dioxide and carbon monoxide. The stream 18 is recycled back to the reformer 4 along with incoming fuel stream 8.

In one embodiment, a portion of the hydrogen stream 16 is used as a fuel for the combustion process in the combustor 6. In this exemplary embodiment as depicted in FIG. 2, complete carbon dioxide isolation is achieved. As the fuel burned in the combustor comprises substantially pure hydrogen, carbon dioxide is not formed during the combustion process in the combustor 6. The hot gas 22, generated from the combustor therefore is free from carbon dioxide and the vented gas 36 to atmosphere does not release any carbon dioxide. The carbon dioxide produced in the reforming process is isolated as a concentrated carbon dioxide stream 14 that is either sequestrated or sold in the merchant market depending on the demand for carbon dioxide. As shown in FIG. 2, a portion of the steam generated 66 in the HRSG 32 is recycled back to the reformer 4 in order provide sufficient quantity of steam for the endothermic reforming reaction (1) and the exothermic water gas shift reaction (2). In some embodiments another portion of the steam 38, generated in the HSRG 32 is sent to a steam turbine (not shown) for additional power generation.

Figure 3:
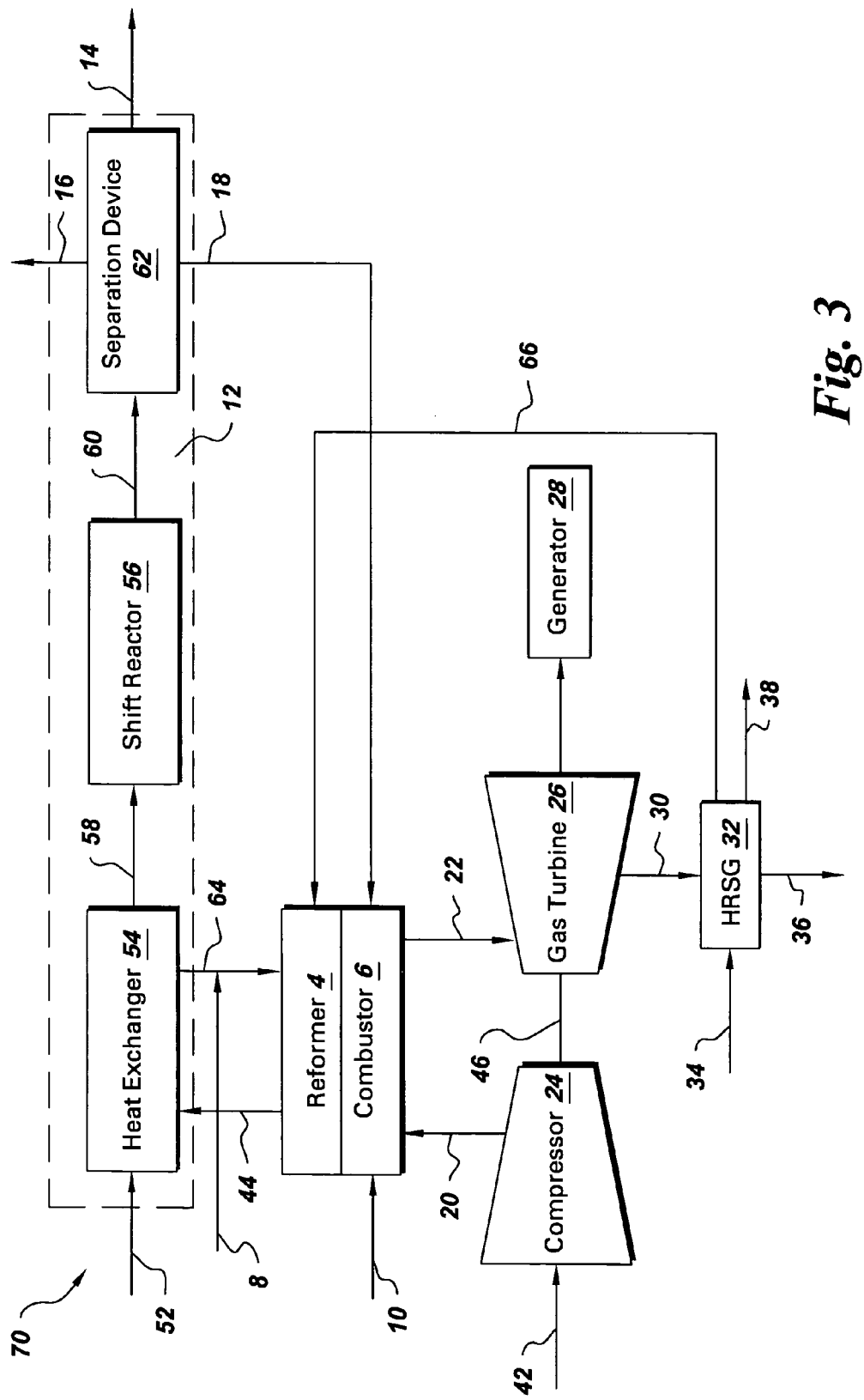
FIG. 3 illustrates a schematic process flow diagram of a third exemplary co-production system.

FIG. 3 illustrates a third exemplary co-production system wherein the off gas stream 18 from the separation device 62 is recycled back to the combustor 6. The off gas stream 18, as described in the earlier sections, typically comprises unburned fuel, $H_2$, CO and $CO_2$. Due to the separation of carbon dioxide in the separation device 62 as a concentrated carbon dioxide stream 14, the carbon dioxide in the exit steam 60 is substantially removed before the off gas 18 is recycled to the combustor 6. So the carbon dioxide generated in the combustor 6, and subsequently released in the atmosphere as an off gas 36 comprises lower amount of carbon dioxide compared to a conventional combined cycle power generation system. Since the carbon dioxide is removed in the pre-combustion stage before recycling of the off gas 18 into the combustor 6, the isolation of carbon dioxide is partially achieved in the co-production system as illustrated in FIG. 3. The removal of the carbon dioxide in the pre combustion stage is easier to achieve as the exit steam 60 from the shift reactor is substantially concentrated in carbon dioxide. Any post combustion separation is difficult to achieve, as the hot compressed gas from the combustor comprises nitrogen, which nitrogen dilutes the concentration of carbon dioxide in the hot compressed gas stream 22 from the combustor 6.

Figure 4:
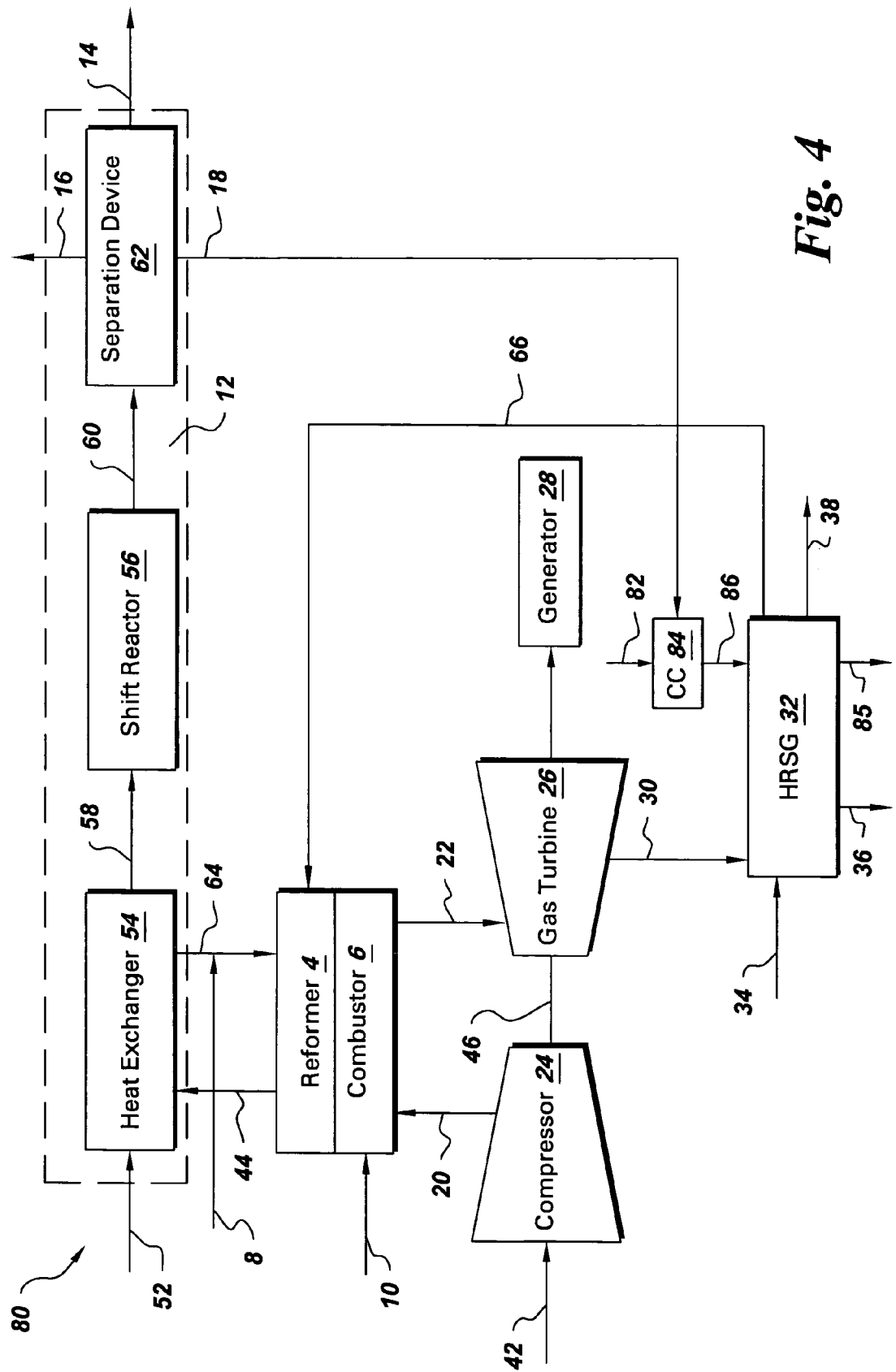
FIG. 4 illustrates a schematic process flow diagram of a fourth exemplary co-production system.

FIG. 4 illustrates a fourth exemplary co-production system wherein the off gas stream 18 is in fluid communication with a secondary combustion chamber 84. The off gas stream 18 from the separation device 62 is fed into the secondary combustor 84 along with an oxidant stream 82, such as, air. In some embodiments, the oxidant stream 82 comprises substantially pure oxygen, wherein the exhaust stream 86 from the secondary reformer is free of any diluant, such as nitrogen. The exhaust stream 86 is cooled in HRSG 32, wherein the fluid path of the exhaust stream 86 is isolated from the flow path of turbine exhaust 30 from the gas turbine 26. The advantage of the co-production system as illustrated in FIG. 4 is the isolation of carbon dioxide, as the fuel burned in the combustor 6 comprises substantially pure hydrogen. A portion of the steam 66, generated from the heat recovery from the turbine exhaust 30 and the exhaust stream 86 from the secondary combustor 84, is recycled to the reformer 4. A portion of the steam 38 may be fed into a steam turbine (not shown) for further power generation. In some embodiments, cooled exhaust streams 36 and 85 from the HRSG 32 is vented into atmosphere.

Figure 5:
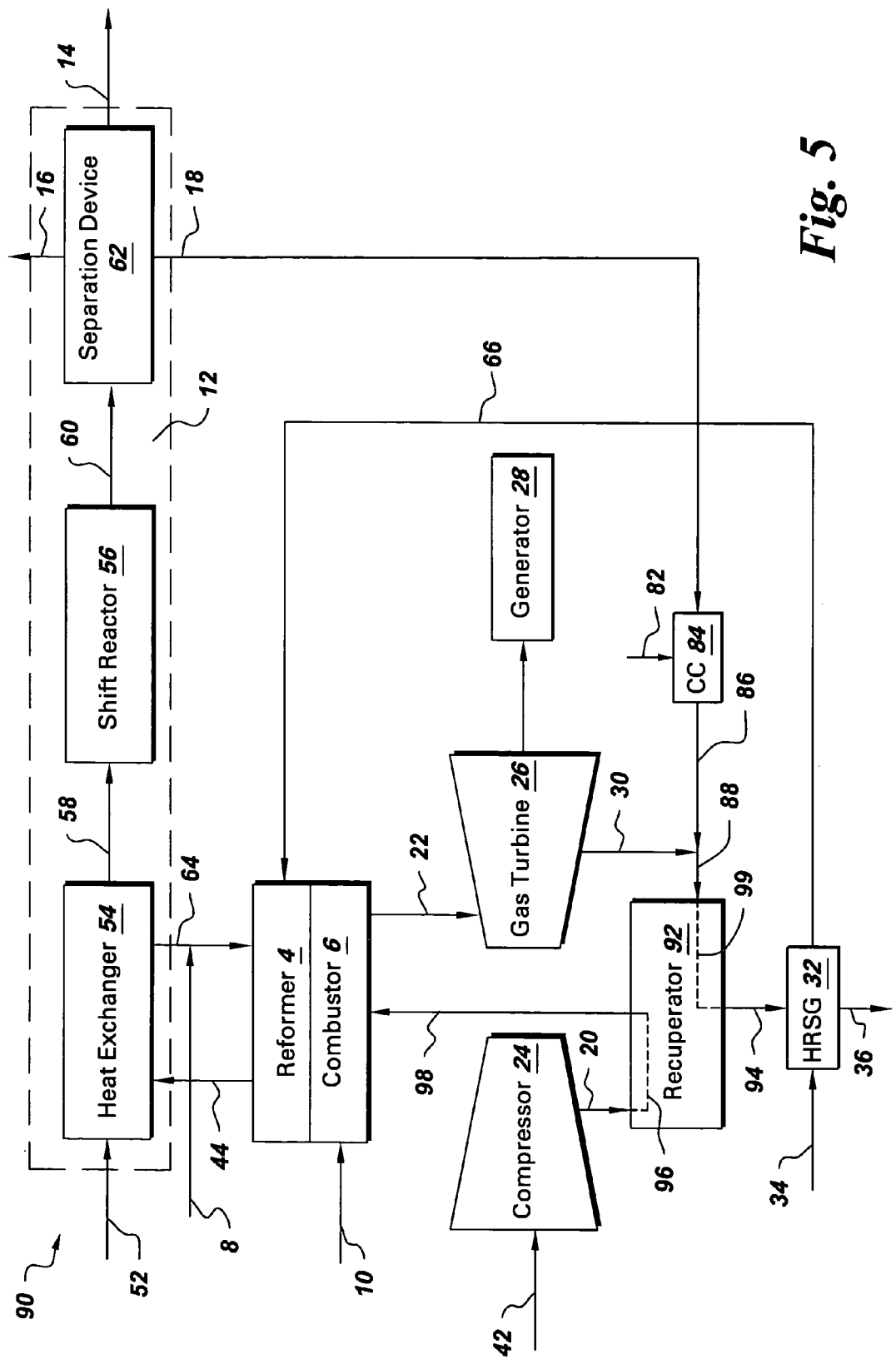
FIG. 5 illustrates a schematic an schematic process flow diagram of a fifth exemplary co-production system.

FIG. 5 illustrates a fifth exemplary co-production system wherein the compressed air stream 20 is directed towards a recuperator 92, which recuperator 92 is a known type of heat exchanger including isolated flow paths. Compressed air stream 20 enters recuperator 92 in a first recuperator flow path 96. The turbine exhaust 30 is mixed with the exhaust 86 from the secondary combustor 84 to form a mixed turbine exhaust stream 88. In some other embodiments, the exhaust 86 from the secondary combustor 84 and the exhaust 30 from the gas turbine 26 have isolated flow paths in the recuperator 92, wherein the oxidant stream 82 to the combustor 82 comprises substantially pure oxygen. As illustrated in FIG. 5 The mixed turbine exhaust stream 88 is passed into the recuperator 92 in a second recuperator flow path 99, whereby the heat from the turbine exhaust 88 is transferred to the compressed air stream 20 without mixing of the compressed air stream 20 and the turbine exhaust stream 88. A heated compressed air stream 98 exits recuperator 92 and flows to the combustor 6 to provide an oxidant thereto. By heating the compressed air stream 20 with turbine exhaust 88, the costs of conventional heaters or regenerative heat exchangers to raise a temperature of the oxidant are avoided, and in turn, the turbine exhaust stream 88 is cooled before being discharged into the atmosphere. The cooled turbine exhaust stream 94 is further fed into the HRSG 32, wherein the incoming water stream 34 is heated to produce steam. The cooled turbine exhaust 36 is vented into the atmosphere and the generated steam 66 is recycled back into the reformer 4.

In all the exemplary embodiments in accordance with the present technique as illustrated in the FIGS. 1, 2, 3, 4, and 5, the reformer 4 and the combustor 6 are coupled. The cooling of the combustor 6 is accomplished by the endothermic reforming of the reforming fuel and the steam. The significant heat absorbed in the endothermic reforming process ensures that the liners of the combustor 6 can be cooled and the combustor operability and the flame stability are improved. The co-production systems disclosed herein also ensure a significant reduction in the NOx production as the lower flame temperatures can be achieved by burning hydrogen rich fuel in the combustor 6 as illustrated by various embodiments described in the earlier sections.

Figure 6:
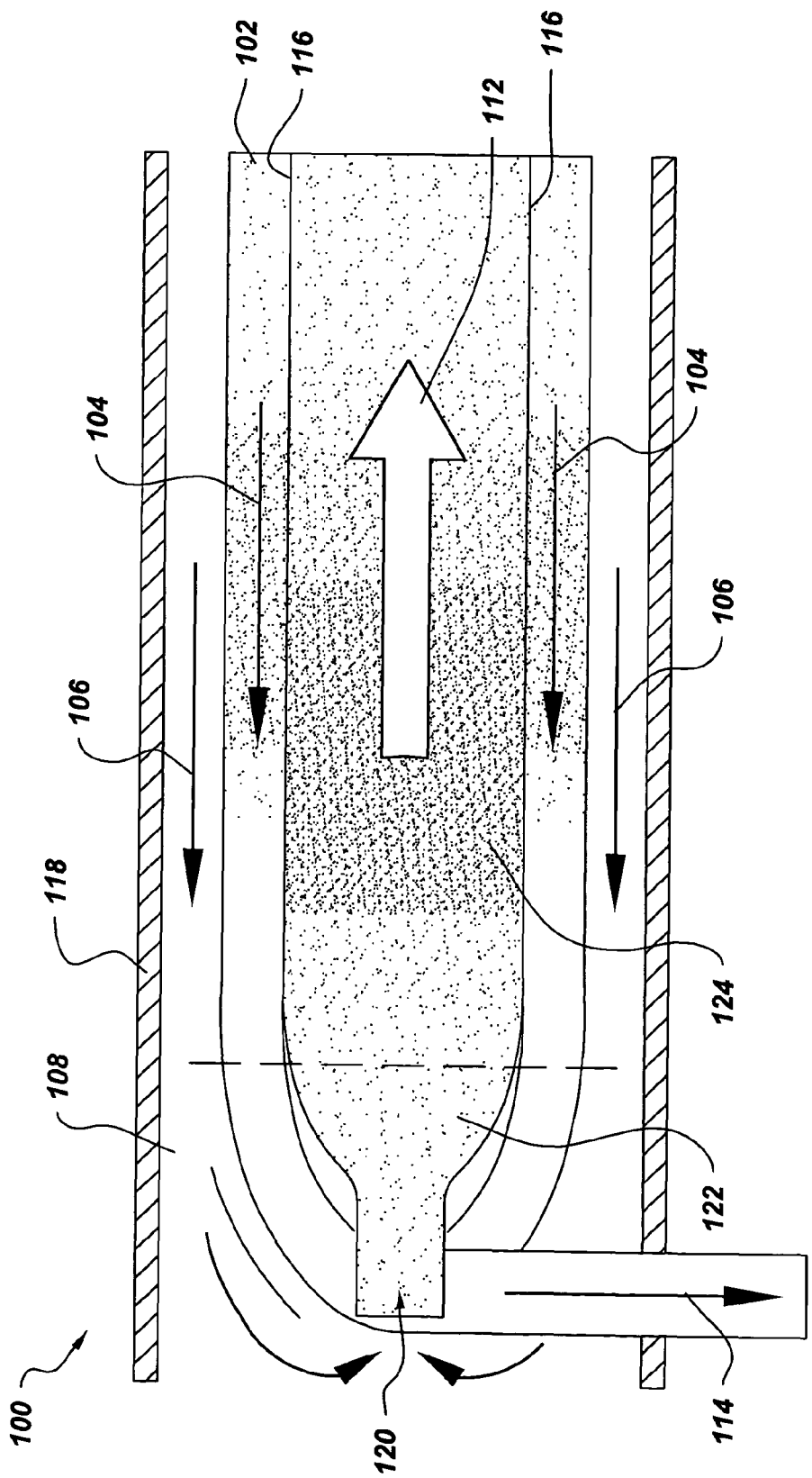
FIG. 6 is a diagrammatical view of an exemplary combustor reformer.

FIG. 6 illustrates a schematic diagram of an exemplary combustor-reformer, wherein the reformer is coupled with the combustor. The coupled reformer-combustor 100 is configured to be disposed in a cylindrical pressure shell 118. The thickness of the pressure shell is designed as per suitable codes depending on the maximum operating pressure of the reformer-combustor 100. The reforming process takes place in a tube 102, which tube is in intimate contact with the combustor 110, wherein the reformer 102 and the combustor 110 are concentric. The compressed air flows through the annular space 108 in the pressure shell as indicated by the airflow 106. The air enters the combustor 110 through the entry port 120. The fuel, such as hydrogen, natural gas or an off gas is also sent to the combustor 110 at the same location (not shown). The mixing of the air and fuel is achieved in the mixing zone 122. The combustion zone 124 primarily generates the heat of the combustion that is dissipated radially and axially through the surface 116, which surface is in contact with the reformer 102. The typical temperature in the combustion zone 124 of the combustor 110 may go up to about 1700° C., a temperature range that is sufficient to provide substantial heat energy to the reforming process. In the process of heat transfer from the combustor 110 to the reformer 102, the liner of the combustor gets cooled thereby enhancing the life of the combustor. The combustor and the reformer are separated by a wall, through which only heat can pass but not material transfer occurs through the wall. A mixture of reforming fuel and steam circulates in the annular space in the reforming tube 102 as indicated by the mixture flow path 104. The reformate, which typically comprises CO2, CO, H2, water and unburned fuel exits the reformer 102 through an opening 114.

Figure 7:
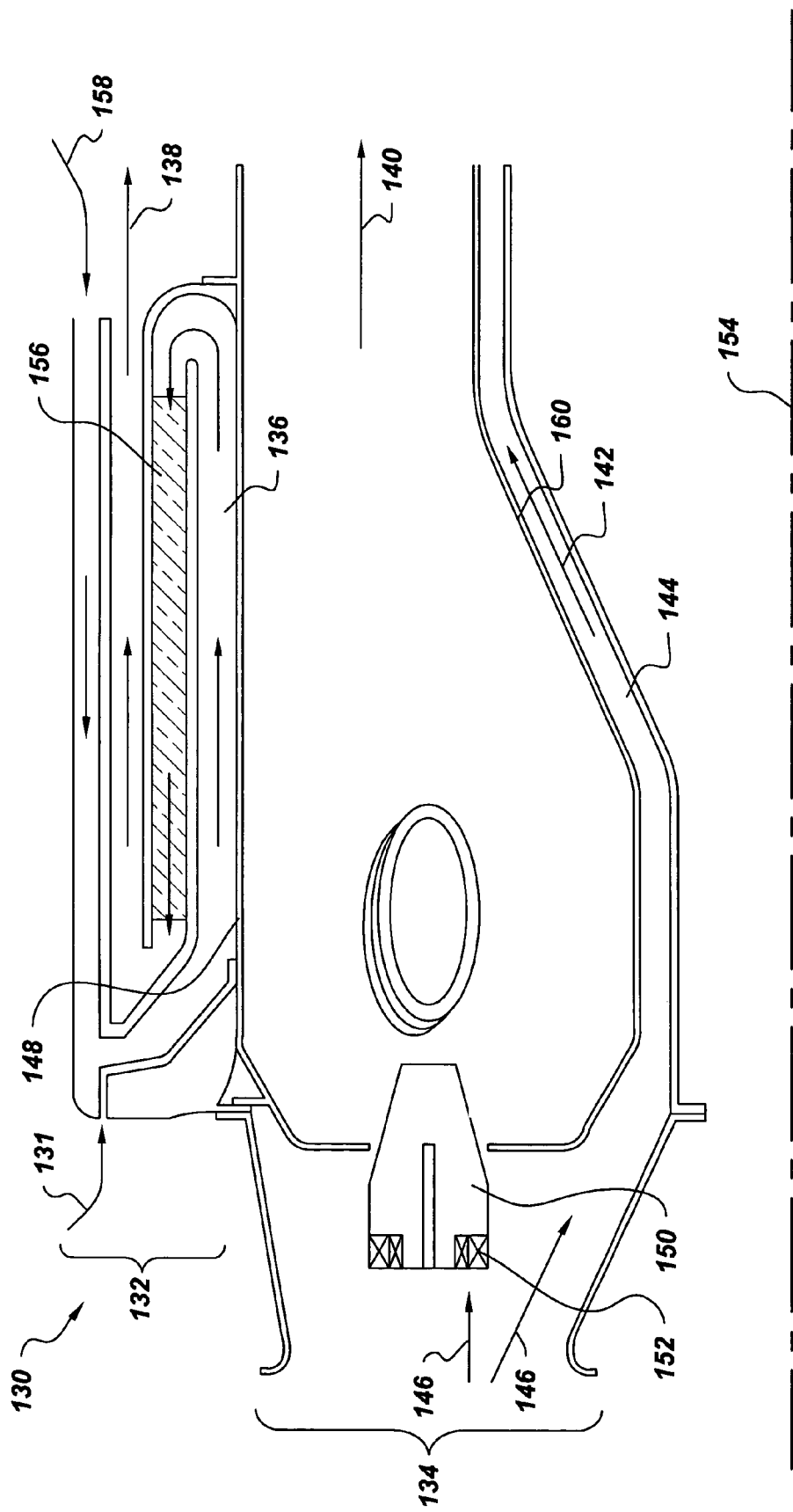
FIG. 7 is a sectional view of yet another exemplary combustor reformer.

FIG. 7 illustrates an upper section of yet another exemplary reformer combustor 130 wherein the combustor and the reformer are thermally coupled through combustor wall, impervious to material transfer. The combustor 134 is a pressure vessel wherein the cross-section of the vessel reduces along with the flow of the combusted gases as shown by the flow path 140. The combustor is an annular structure in the shape as illustrated in FIG. 7 when rotated 360 Degree along the centerline 154. The reformer 132 is another annular structure rotated 360 Degree along the same centerline 154. The combustor 134 comprises an upper liner 148 in intimate contact with the reformer 132 and a bottom liner 160. The upper liner 148 separates the combustor 132 and reformer 132. The liner 148 is impervious for material transfer, but allows heat to be transferred through the wall. The combustor 134 further comprises a pre-mixer 150, which pre-mixer 150 is configured to have ports through which fuel and oxidant can enter the combustor 134. In some embodiments, the premixed fuel and oxidant is injected into the combustor 134 through a nozzle comprising a swirler, which swirler comprises a plurality of swirl vanes that impart rotation to the entering oxidant and a plurality of fuel spokes that distribute fuel in the rotating oxidant stream. The oxidant 146, such as air is used for the combustion and the cooling of the bottom liner 160 of the combustor 134. The fuel and oxidant are mixed in an annular passage within the premix fuel nozzle before reacting within the combustor 134. The reformer 132 comprises a path 131 for introducing steam and a path 158 for introducing a reforming fuel. The mixture of the reforming fuel and steam flows through the path 136 wherein the endothermic reaction (1) absorbs the heat transferred from the combustor 134 into the reformer 132. The heat energy is transferred from the combustor 134 to the reformer 132 through radial and axial heat dissipation through conduction and convection thereby cooling the outer liner 148 of the combustor 134. The reformer 132 further comprises a catalyst bed 156, which catalyst bed 156 contains a reforming catalyst, such as nickel. The reformate flows out of the reformer 132 through a flow path 138. The inner liner 160 of the combustor 134 is cooled using a portion of the compressed air 146, wherein the air 142 is circulated though an annular space 144 between the inner liner 160 and the bottom shell 162 of the combustor.

In various embodiments in accordance with the present technique, as described above, the cooling of the combustor is accomplished endothermic reforming of a fuel, such as natural gas, which cooling enables co-production of hydrogen and electricity with improved total system efficiency. The significant heat absorbed in the endothermic reforming process ensures that the liners in the combustors can be cooled and the combustor operability and flame stabilization are maintained or improved. When a portion of hydrogen produced in the co-production system is used as the fuel for the combustor, it ensures significant reduction in NOx production, as lower flame temperatures can be achieved when a fuel high in hydrogen content is burned in the combustor. The pre-combustion separation of carbon dioxide in the separation unit ensures isolation and limited emission of $CO_2$ in to the atmosphere. The disclosed co-production method improves the overall plant performance by transferring some of the waste heat from the electricity production to hydrogen production, thus improving the efficiency and operability of the plant. The co-production systems disclosed herein have the flexibility to control the production of hydrogen from the reformate stream from the reformer and generation of electrical energy depending on the demand. The hydrogen produced in the disclosed co-production system may be utilized in several ways. The hydrogen produced may be recycled to the combustor to be used as a fuel to achieve carbon dioxide free emission to atmosphere. The hydrogen produced may be stored in a hydrogen storage unit, which storage units may include vessels, cylinders or solid material such as metal hydrides. Subsequently the hydrogen produced may be transported either in gaseous form or liquid form, such as by means of a liquefaction plant. The hydrogen produced may also be used as a fuel in a fuel cell system comprising one or more fuel cells to generate additional power.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A system for co-production of hydrogen and electrical energy comprising:
   a reformer configured to receive a reformer fuel and steam and produce a reformate rich in hydrogen;
   a separation unit in fluid thermal communication with said reformer wherein said separation unit is configured to receive said reformate to separate hydrogen from said reformate and produce an off gas;
   a combustor configured to receive a fuel for combustion and produce heat energy and a hot compressed gas, and
   a gas turbine to expand said hot compressed gas and produce electrical energy and an expanded gas;
   wherein said reformer and said combustor are separated by a wall configured to avoid material transfer through said wall and at least a part of said heat energy from said combustor is used to produce said reformate in said reformer.

2. The system according to claim 1, wherein at least a part of said off gas is recycled back to said reformer after separation of hydrogen.

3. The system according to claim 1, wherein said reformate further comprises carbon monoxide, carbon dioxide and said reformer fuel.

4. The system according to claim 3, wherein said separation unit further comprises at least one water gas shift reactor to convert carbon monoxide to carbon dioxide to a hydrogen and carbon dioxide rich stream.

5. The system according to claim 1 further comprising a heat exchanger to generate steam.

6. The system according to claim 1, wherein said separation unit further comprises a separating device selected from the group consisting of at least one of a chemical absorber, a pressure swing adsorber, a cryogenic separator, membrane a separator and a liquefier.

7. The system according to claim 4, wherein said separation unit is configured to separate carbon dioxide from said hydrogen and carbon dioxide rich stream.

8. The system according to claim 1, wherein said expanded gas produced from said gas turbine comprises substantially low concentration of carbon dioxide.

9. The system according to claim 1 further comprises a heat recovery steam generator (HRSG) to generate steam and a steam turbine to generate power using at least a portion of said steam from said HRSG.

10. The system according to claim 1 wherein said hydrogen from said separation unit is used to operate a fuel cell system comprising one or more fuel cells to generate electrical energy.

11. The system according to claim 1 further comprising a hydrogen storage unit.

12. The system according to claim 1, wherein said off gas from said separation unit is recycled into said combustor.

13. The system according to claim 1, wherein said off gas is burned in a secondary combustor.

14. A system for co-production of hydrogen and electrical energy comprising:
   a reformer configured to receive a reformer fuel and steam and produce a reformate rich in hydrogen;
   a combustor configured to receive a fuel for combustion and produce heat energy and a hot compressed gas;
   a separation unit in fluid communication with said reformer wherein said separation unit is configured to receive said reformate to separate hydrogen from said reformate and produce an off gas; and
   a gas turbine to expand said hot compressed gas and produce electrical energy and an expanded gas;
   wherein said reformer and said combustor are separated by a wall configured to avoid material transfer through said wall and at least a part of said heat energy from said combustor is used to produce said reformate in said reformer and said separation unit is configured to separate carbon dioxide from said reformate and recycle at least a part of said off gas to said reformer.

15. The system according to claim 14, wherein said reformate further comprises carbon monoxide, carbon dioxide and said reformer fuel.

16. The system according to claim 15, wherein said separation unit further comprises at least one water gas shift reactor to convert carbon monoxide to carbon dioxide to a hydrogen and carbon dioxide rich stream.

17. The system according to claim 15, wherein said separation unit further comprises a separating device selected from the group consisting of at least of a chemical absorber, a pressure swing adsorber, a cryogenic separator, membrane a separator and a liquefier.

18. The system according to claim 16, wherein said separation unit is configured to separate carbon dioxide from said hydrogen and carbon dioxide rich stream.

19. A method for co-production of hydrogen and electrical energy comprising the steps of:
   reforming a mixture of a reformer fuel and steam in a reformer and producing a reformate rich in hydrogen;
   separating hydrogen from said reformate and producing an off gas;

combusting a fuel in a combustor and producing heat energy and a hot compressed gas; and expanding said hot compressed gas in a gas turbine expanding and producing electrical energy and an expanded gas;

wherein said reformer and said combustor are separated by a wall configured to avoid material transfer through said wall at least a part of said heat energy from said combustor is used to produce said reformate in said reformer.

20. The method according to claim 19 further comprising recycling at least a part of said off gas back to said reformer after separation of hydrogen.

* * * * *

UNITED STATES PATENT AND TRADEMARK OFFICE
CERTIFICATE OF CORRECTION

| | | |
|---|---|---|
| PATENT NO. | : 7,752,848 B2 | Page 1 of 1 |
| APPLICATION NO. | : 10/810471 | |
| DATED | : July 13, 2010 | |
| INVENTOR(S) | : Balan et al. | |

It is certified that error appears in the above-identified patent and that said Letters Patent is hereby corrected as shown below:

In Column 4, Line 21, delete "HSRG" and insert -- HRSG --, therefor.

In Column 4, Line 60, delete "art" and insert -- art, --, therefor.

In Column 4, Line 61, delete "adsorptions" and insert -- adsorption, --, therefor.

In Column 5, Line 35, delete "absorptionl" and insert -- absorption --, therefor.

In Column 6, Line 36, delete "HSRG" and insert -- HRSG --, therefor.

In Column 7, Line 26, delete "FIG. 5" and insert -- FIG. 5. --, therefor.

In Column 8, Line 14, delete "pass" and insert -- pass, --, therefor.

In Column 9, Line 64, in Claim 4, delete "3." and insert -- 3, --, therefor.

In Column 10, Line 6, in Claim 6, delete "membrane a" and insert -- a membrane --, therefor.

In Column 10, Line 57, in Claim 17, delete "membrane a" and
insert -- a membrane --, therefor.

Signed and Sealed this

Twenty-third Day of November, 2010

David J. Kappos
*Director of the United States Patent and Trademark Office*